(12) United States Patent
Trötsch-Schaller et al.

(10) Patent No.: US 6,303,832 B1
(45) Date of Patent: Oct. 16, 2001

(54) OXYALKYLATION OF ALKANOLS WITH ALKYLENE OXIDES

(75) Inventors: Irene Trötsch-Schaller, Bissersheim; Günter Oetter, Frankenthal; Knut Oppenländer, Ludwigshafen; Michael Stösser, Neuhofen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/702,725

(22) Filed: Nov. 1, 2000

(30) Foreign Application Priority Data

Nov. 9, 1999 (DE) ................................................ 199 53 850

(51) Int. Cl.⁷ ........................... C07C 43/11; C07C 43/18; C07C 43/20

(52) U.S. Cl. ............................................ 568/606; 568/618

(58) Field of Search ....................................... 568/606, 618

(56) References Cited

U.S. PATENT DOCUMENTS

| | | |
|---|---|---|
| 4,306,943 | 12/1981 | Mori et al. . |
| 4,962,237 | 10/1990 | Laycock . |
| 5,344,996 | 9/1994 | Nieh et al. . |
| 5,679,764 | * 10/1997 | Pazos . |
| 5,773,525 | * 6/1998 | Pazos . |

FOREIGN PATENT DOCUMENTS

| | | |
|---|---|---|
| 339 426 | 11/1989 | (EP) . |
| 38 43 713 | 11/1989 | (DE) . |
| 6-234847 | 8/1994 | (JP) . |

* cited by examiner

Primary Examiner—Johann Richter
Assistant Examiner—Sikarl A. Witherspoon
(74) Attorney, Agent, or Firm—Oblon, Spivak, McClelland, Maier & Neustadt, P.C.

(57) ABSTRACT

Alkanols are oxyalkylated by a process in which the reaction is carried out using a heterogeneous basic catalyst which is selected from basic aluminates, and the compounds prepared thereby are used as carrier oils in fuel additives or as nonionic surfactants in detergents or cleaning agents.

8 Claims, No Drawings

OXYALKYLATION OF ALKANOLS WITH ALKYLENE OXIDES

The present invention relates to a process for the oxyalkylation of alkanols, the reaction being carried out using a heterogeneous basic catalyst, which is selected from basic aluminates; the compounds prepared therewith and their use as carrier oils for fuel detergent additives or as nonionic surfactants in detergents or cleaning agents.

The catalytic oxyalkylation of organic compounds by means of an alkylene oxide has long been known. Homogeneous or heterogeneous catalysts are in principle suitable. The reaction products are referred to as oxyalkylates or alkoxylates. Oxyalkylates of alkanols are used, for example, as carrier oils in fuel additive mixtures or as nonionic surfactants in detergents and cleaning agents.

For the synthesis of carrier oils, $C_2$–$C_{20}$-alkanols are usually used, preferably a $C_{13}$-alcohol (tridecanol N). Preferably used alkylene oxides are propylene oxide and butylene oxide.

For the synthesis of nonionic surfactants, $C_2$–$C_{22}$-alkanols, preferably oxo alcohols, are usually used. Oxo alcohols are known to be predominantly monohydric alcohols obtainable by oxo synthesis, such as $C_{13}$–$C_{15}$-oxo alcohols or $C_{11}$-oxo alcohols or mixtures thereof. A preferably used alkylene oxide is ethylene oxide.

After the oxyalkylation of the alkanol, it is necessary to remove the catalyst from the reaction product. This is particularly true for the reaction products used as carrier oils or nonionic surfactants, since the catalyst residues on the one hand can have a corrosive action and on the other hand can lead to undesired deposits and emissions during combustion in the engine space. In the case of heterogeneous catalysis, it is possible to remove the catalyst by filtration, for which purpose, however, correspondingly good filterability of the catalyst is required. In the case of homogeneous acid or base catalysis, corresponding neutralization is suitable. For example, after the use of base catalysis, the corresponding catalyst is removed from the reaction mixture by finish processes.

For example, hydrotalcite which has been rendered hydrophobic has been used for the heterogeneous catalysis of the oxylation of various organic compounds (cf. DE-A-38 43 713 or U.S. Pat. No. 4,962,237). However, the removal of said hydrotalcite by filtration is very unsatisfactory because presumably the pores of the deep filter used for this purpose become blocked and thus complicate the filtration process.

The removal of the preferably basic additive used for the homogeneous catalysis of the oxyalkylation, in particular potassium hydroxide, sodium hydroxide, alkaline earth metal oxides, alkali metal and/or alkaline earth metal carbonates and/or hydroxides, is preferably effected by neutralization with the aid of phosphoric acid with formation of the corresponding phosphate (cf. U.S. Pat. No. 4,306,943). In this process, the exact metering of the phosphoric acid is critical. Moreover, the phosphate formed must be disposed of in a landfill or incinerated.

Further processes for removing the catalyst are also known, for example adsorption on a carrier material, for example magnesium silicate, in which case the pyrophoric character of the material wet with alkoxylate is critical. In another known process, the catalyst is removed by using an ion exchanger.

It is an object of the present invention to provide an improved process for the oxyalkylation of alkanols.

We have found that this object is achieved, surprisingly, by using basic aluminates as heterogeneous catalysts for the oxyalkylation of alkanols. This makes it possible to avoid the disadvantages of the prior art processes in a surprisingly advantageous manner.

We have found, surprisingly, that basic aluminates catalyze the oxyalkylation of alkanols extremely selectively and moreover can be readily filtered off after the reaction, so that the expensive finish processes required to date need no longer be carried out. The basic aluminates furthermore have a basicity which is comparable with that of potassium hydroxide or sodium hydroxide. In addition, improved space-time yields are obtained.

We have also surprisingly found that, in comparison with the use of homogeneous catalysts, such as KOH, the use of basic aluminates as catalysts does not have an adverse effect on the performance characteristics of the reaction products when used as carrier oil or nonionic surfactant.

The present invention therefore relates firstly to a process for the oxyalkylation of alkanols, at least one alkanol being reacted with at least one alkylene oxide in a base-catalyzed reaction, wherein the reaction is carried out using a heterogeneous basic catalyst which is selected from basic aluminates.

The basic aluminates used according to the invention as a catalyst are, for example, alkali metal or alkaline earth metal aluminates, in particular sodium or potassium aluminate. However, other aluminates may also be used provided that they have sufficient basicity. Basic aluminates can be used in solid form, for example individually or in the form of mixtures of a plurality of aluminates as catalyst compositions.

Sodium aluminate is a substance having the following composition:

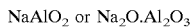

$$NaAlO_2 \text{ or } Na_2O.Al_2O_3$$

which has a three-dimensional network structure (cf. Roempp Chemielexikon, 9th edition, vol. 1, under the keyword "Aluminate", on page 131) and Hollemann/Wiberg, Lehrbuch der anorganischen Chemie, 81st–90th edition, page 647 et seq., Sauerstoffverbindungen des Aluminiums).

The novel process is not subject to any particular restrictions with regard to the alkanols and alkylene oxides which can be used.

Examples of alkanols which can be used are monohydric, dihydric, trihydric, tetrahydric and polyhydric alkanols, such as the compounds disclosed in DE-A-38 43 713, on page 3, lines 35–41 and lines 47–50, in U.S. Pat. No. 4,962,237, in column 2, lines 29–41, or in U.S. Pat. No. 4,306,943, in column 1, lines 50–58, which are hereby incorporated by reference.

If the novel process is used specifically for the preparation of carrier oils, for example, $C_2$–$C_{20}$-alkanols are used, preferably $C_{13}$-alkanol (tridecanol N). If nonionic surfactants are specifically to be prepared, for example, $C_2$–$C_{22}$-alkanols, preferably $C_{13}$–$C_{15}$-oxo alcohols, $C_{15}$–$C_{17}$-oxo alcohols or $C_9$–$C_{11}$-oxo alcohols, e.g. $C_{10}$-oxo alcohols and $C_{11}$-oxo alcohols, are used.

Furthermore, the alkylene oxides to be reacted are not subject to any particular restrictions per se. For example, the compounds stated in U.S. Pat. No. 4,962,237, in column 3, lines 12–20, may be used. If carrier oils are to be synthesized, propylene oxide or butylene oxide is preferably used. In the case of the preparation of nonionic surfactants, ethylene oxide is preferably used.

The amounts of alkylene oxide used may be varied over a wide range and depend primarily on the desired property profile of the oxyalkylate and on the type of the respective alkylene oxide. The amounts are usually from 1 to 100 mol per mole of initiator (i.e. alcoholate). For example, from 1 to 20, preferably from 10 to 20, mol of propylene oxide, from 1 to 40, preferably from 18 to 30, mol of butylene oxide, and from 1 to 100, preferably from 3 to 80, mol of ethylene oxide, in each case per mole of initiator, may be used.

The novel process is preferably carried out by a procedure in which a) the alkanol is first activated with a basic aluminate and then b) the activated alkanol is oxyalkylated with the alkylene oxide.

The alkanol is first mixed with the basic aluminate in an amount of from 0.1 to 1.0, preferably from 0.1 to 0.3, % by weight, based on the total weight of alkanol and alkylene oxide, and usually treated before the reaction under reduced pressure of from about 1 to 100, for example 20–40, mbar and, for example, at from 20 to 150° C., preferably from about 50 to 100° C. (for example on a rotary evaporator), for example for from about 1 to 2 hours, for the preparation of the alcoholate (initiator).

The alcoholate (initiator) formed is then reacted under pressure, for example in an autoclave, for example at from 1 to 10, usually from 6 to 8, bar and at from 100 to 160° C., with the alkylene oxide. Preferred reaction temperatures are about 135° C. in the case of propylene oxide, about 145° C. in the case of butylene oxide and about 130° C. in the case of ethylene oxide. The rate of addition of the alkylene oxide is, for example, from about 0.5 to 2, preferably from about 1 to 1.5, mol/h. The optimum reaction condition can be determined by a person skilled in the art without great experimental effort, by a few preliminary experiments.

Reaction steps a) and b) can, if required, be carried out in the presence of a suitable inert solvent, e.g. xylene.

After the reaction is complete, the catalyst is filtered off. For this purpose, it is also possible to add a filtration aid, for example kieselguhr. The filtration is carried out in a conventional manner, for example under pressure and with the use of a deep-bed filter.

The present invention furthermore relates to oxyalkylated alkanols, obtainable by a novel process. Oxyalkylated alkanols which are obtainable by reacting at least one straight-chain or branched, monohydric $C_2$–$C_{22}$-alkanol, e.g. tridecanol N, with from 10 to 30 mol of at least one $C_3$- or $C_4$-alkylene oxide, e.g. propylene oxide or butylene oxide, are preferred. These are preferably used as carrier oils in fuel and additive formulations. Oxyalkylated alkanols obtainable by reacting at least one straight-chain or branched, monohydric $C_2$–$C_{22}$-alkanol, for example a $C_{13}$–$C_{15}$-oxo alcohol or $C_9$–$C_{11}$-oxo alcohol, such as a $C_{11}$-oxo alcohol, with from 3 to 80 mol of ethylene oxide are also preferred. These are preferably used as nonionic surfactants in detergents or cleaning agents.

The present invention also relates to fuel additive concentrates containing, in addition to conventional additive components, at least one oxyalkylated alkanol according to the above definition in an amount of from about 10 to 50, for example from about 20 to 40 or from 25 to 35, % by weight as a carrier oil.

The present invention furthermore relates to detergents or cleaning agents containing, in addition to conventional components, at least one oxyalkylated alkanol according to the above definition as a nonionic surfactant component in an amount of from about 1 to 20, for example from about 5 to 10, % by weight.

The present invention also relates to fuel compositions for internal combustion engines, containing at least one oxyalkylated alkanol as a carrier oil component in an amount of from 100 to 10,000 mg/kg of fuel in a main amount of a liquid hydrocarbon fuel.

The carrier oils prepared according to the invention can advantageously be combined with conventional detergent additives. Examples of suitable additives having a detergent action are those which contain at least one hydrophobic hydrocarbon radical having a number average molecular weight ($M_n$) of 85 to 20 000 and at least one polar group which is selected from (a) mono- or polyamino groups having up to 6 nitrogen atoms, at least one nitrogen atom having basic properties, (b) nitro groups, if desired in combination with hydroxyl groups, (c) hydroxyl groups in combination with mono- or polyamino groups, at least one nitrogen atom having basic properties, (d) carboxyl groups or their alkali metal or alkaline earth metal salts, (e) sulfo groups or their alkali metal or alkaline earth metal salts, (f) polyoxy-$C_2$–$C_4$-alkylene groups which are terminated by hydroxyl groups, by mono- or polyamino groups, at least one nitrogen atom having basic properties, or by carbamate groups, (g) carboxylic ester groups, (h) groups derived from succinic anhydride and having hydroxyl and/or amino and/or amido and/or imido groups and (i) groups produced by Mannich reaction of phenolic hydroxyl groups with aldehydes and mono- or polyamines.

The hydrophobic hydrocarbon radical in these detergent additives, which ensures sufficient solubility in the fuel, has a number average molecular weight ($M_n$) of from 85 to 20,000, in particular from 113 to 10,000, especially from 300 to 5000. Suitable typical hydrophobic hydrocarbon radicals, in particular in combination with the polar groups (a), (c), (h) and (i) are the polypropenyl, polybutenyl and polyisobutenyl radicals, each having an $M_n$ of from 300 to 5000, in particular from 500 to 2500, especially from 750 to 2250.

Examples of further gasoline fuel additives having polar groups (a) are polyalkenylmonoamines or polyalkenylpolyamines or functional derivatives thereof based on polypropene, polybutene or polyisobutene. Examples of polyalkenylamines are poly-$C_2$–$C_6$-alkenylamines or functional derivatives thereof. These compounds may have a number average molecular weight $M_n$ of from 300 to 5000. Particularly preferred detergent additives are selected from polyisobutenylamines and functional derivatives thereof, as described, for example, in EP-A-0 244 616 and EP-A-0 578 323. The polyisobutenylamines usually have a number average molecular weight $M_n$ of from about 150 to about 5000, preferably from about 500 to 2000, in particular from about 800 to 1500, g per mol.

Examples of further fuel additives having polar groups (b) are the reaction products of polyisobutenes having an average degree of polymerization P of from 5 to 100 with oxides of nitrogen or mixtures of oxides of nitrogen and oxygen.

Examples of further fuel additives having polar groups (c) are the reaction products of polyisobutene epoxides which are obtainable from polyisobutene having predominantly terminal double bonds and a number average molecular weight $M_n$ of from 300 to 5000 with ammonia or mono- or polyamines.

Examples of further fuel additives having polar groups (d) are copolymers of $C_2$–$C_{40}$-olefins with maleic anhydride having a total molar mass of from 500 to 20,000, some or all of whose carboxyl groups have been reacted to give the alkali metal or alkaline earth metal salts and the remainder of the carboxyl groups have been reacted with alcohols or amines.

Examples of further fuel additives having polar groups (e) are alkali metal or alkaline earth metal salts of an alkyl sulfosuccinate.

Examples of further fuel additives having polar groups (f) are polyethers or polyetheramines or functional derivatives thereof which are obtainable by reacting $C_2$–$C_{30}$-alkanols, $C_6$–$C_{60}$-alkanediols, mono- or di-$C_2$–$C_{30}$-alkylamines, $C_1$–$C_{30}$-alkylcyclohexanols or $C_1$–$C_{30}$-alkylphenols with from 1 to 30 mol of ethylene oxide and/or propylene oxide and/or butylene oxide per hydroxyl group or amino group and, in the case of the polyetheramines, by subsequent reductive amination with ammonia, monoamines or polyamines. For example, the polyetheramines used may be poly-$C_2$–$C_6$-alkylene oxide amines or functional derivatives thereof.

Examples of further fuel additives having polar groups (g) are esters of a mono-, di- or tricarboxylic acid with long-chain alkanols or polyols.

Examples of further fuel additives having polar groups (h) are derivatives of polyisobutenylsuccinic anhydride, which are obtainable by reacting conventional or highly reactive polyisobutene having an $M_n$ of from 300 to 5000 with maleic anhydride by a thermal method or via the chlorinated polyisobutene.

Examples of further fuel additives having polar groups (i) are the reaction products of polyisobutene-substituted phenols with formaldehyde and mono- or polyamines.

Specific examples of further fuel additives having a detergent action are furthermore the following.

Additives containing mono- or polyamino groups (a) are preferably polyalkenylmono- or polyalkenylpolyamines based on polypropene or on highly reactive (i.e. having predominantly terminal double bonds generally in the β- and γ-position) or conventional (i.e. having predominantly central double bonds) polybutene or polyisobutene having an $M_n$ of from 300 to 5000. Such additives based on highly reactive polyisobutene, which can be prepared from the polyisobutene, which may contain up to 20% by weight of n-butene units, by hydroformylation and reductive amination with ammonia, monoamines or polyamines, such as dimethylaminopropylamine, ethylenediamine, diethylenetriamine, triethylenetetramine or tetraethylenepentamine, are disclosed in particular in EP-A-244 616. If polybutene or polyisobutene having predominantly central double bonds (generally in the β- and γ-position) is used as a starting material in the preparation of the additives, a possible preparation route is by chlorination and subsequent amination or by oxidation of the double bond with air or ozone to give the carbonyl or carboxyl compound and subsequent amination under reductive (hydrogenating) conditions. The same amines as above for the reductive amination of the hydroformylated highly reactive polyisobutene can be used here for the amination. Corresponding additives based on polypropene are described in particular in WO-A-94/24231.

Further preferred additives containing monoamino groups (a) are the hydrogenation products of the reaction products of polyisobutenes having an average degree of polymerization P of from 5 to 100 with oxides of nitrogen or mixtures of oxides of nitrogen and oxygen, as described in particular in WO-A-97/03946.

Further preferred additives containing monoamino groups (a) are the compounds obtainable from polyisobutene epoxides by reaction with amines and subsequent dehydration and reduction of the amino alcohols, as described in particular in DE-A-196 20 262.

Additives containing nitro groups, if desired in combination with hydroxyl groups (b) are preferably reaction products of polyisobutenes having an average degree of polymerization P of from 5 to 100 or from 10 to 100 with oxides of nitrogen or mixtures of oxides of nitrogen and oxygen, as described in particular in WO-A-96/03367 and in WO-A-96/03479. These reaction products are as a rule mixtures of pure nitropolyisobutanes (e.g. α,β-dinitropolyisobutane) and mixed hydroxynitropolyisobutanes (e.g. α-nitro-β-hydroxypolyisobutane).

Additives containing hydroxyl groups in combination with mono- or polyamino groups (c) are in particular reaction products of polyisobutene epoxides, obtainable from polyisobutene preferably having predominantly terminal double bonds and having an $M_n$ of from 300 to 5000 with ammonia or mono- or polyamines, as described in particular in EP-A-476 485.

Additives containing carboxyl groups or their alkali metal or alkaline earth metal salts (d) are preferably copolymers of $C_2$–$C_{40}$-olefins with maleic anhydride, having a total molar mass of from 500 to 20,000, some or all of whose carboxyl groups have been reacted to give alkali metal or alkaline earth metal salts and the remainder of the carboxyl groups have been reacted with alcohols or amines. Such additives are disclosed in particular in EP-A-307 815. Such additives are mainly used for preventing valve seat wear and, as described in WO-A-87/01126, can advantageously be used in combination with conventional fuel detergents, such as poly(iso)butenylamines or polyetheramines.

Additives containing sulfo groups or their alkali metal or alkaline earth metal salts (e) are preferably alkali metal or alkaline earth metal salts of an alkyl sulfosuccinate, as described in particular in EP-A-639 632. Such additives are mainly used for preventing valve seat wear and can advantageously be used in combination with conventional fuel detergents, such as poly(iso)butenylamines or polyetheramines.

Additives containing polyoxy-$C_2$–$C_4$-alkylene groups (f) are preferably polyethers or polyetheramines which are obtainable by reacting $C_2$–$C_{60}$-alkanols, $C_6$–$C_{30}$-alkanediols, mono- or di-$C_2$–$C_{30}$-alkylamines, $C_1$–$C_{30}$-alkylcyclohexanols or $C_1$–$C_{30}$-alkylphenols with from 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described in particular in EP-A-310 875, EP-A-356 725, EP-A-700 985 and U.S. Pat. No. 4,877,416. In the case of polyethers, such products also have carrier oil properties. Typical examples of these are tridecanol or isotridecanol butoxylates, isononylphenol butoxylates and polyisobutenol butoxylates and propoxylates and the corresponding reaction products with ammonia.

Additives containing carboxylic ester groups (g) are preferably esters of mono-, di- or tricarboxylic acids with long-chain alkanols or polyols, in particular those having a minimum viscosity of 2 mm²/s at 100° C., as described in particular in DE-A-38 38 918. Mono-, di- or tricarboxylic acids which may be used are aliphatic or aromatic acids, and suitable ester alcohols or ester polyols are in particular long-chain members having, for example, 6 to 24 carbon atoms. Typical members of the esters are adipates, phthalates, isophthalates, terephthalates and trimellitates of isooctanol, of isononanol, of isodecanol and of isotridecanol. Such products also have carrier oil properties.

Additives containing groups derived from succinic anhydride and having hydroxyl and/or amino and/or amido and/or imido groups (h) are preferably corresponding derivatives of polyisobutenylsuccinic anhydride, which are obtainable by reacting conventional or highly reactive polyisobutene having an $M_n$ of from 300 to 5000 with maleic anhydride by a thermal method of chlorinated polyisobutene. of particular interest here are derivatives with aliphatic polyamines, such as ethylenediamine, diethylenetriamine, triethylenetetramine or tetraethylenepentamine. Such gasoline fuel additives are described in particular in U.S. Pat. No. 4,849,572.

Additives containing groups (i) produced by Mannich reaction of phenolic hydroxyl groups with aldehyde and mono- or polyamines are preferably reaction products of polyisobutene-substituted phenols with formaldehyde and mono- or polyamines, such as ethylenediamine, diethylenetriamine, triethylenetetramine, tetraethylenepentamine or dimethylaminopropylamine. The polyisobutene-substituted phenols may originate from conventional or highly reactive polyisobutene having an $M_n$ of from 300 to 5000. Such polyisobutene Mannich bases are described in particular in EP-A-831 141.

Further detergent additives suitable according to the invention are described, for example, in EP-A-0 277 345, 0 356 725, 0 476 485, 0 484 736, 0 539 821, 0 543 225, 0 548 617, 0 561 214, 0 567 810 and 0 568 873, in DE-A-39 42 860, 43 09 074, 43 09 271, 43 13 088, 44 12 489, 0 44 25 834, 195 25 938, 196 06 845, 196 06 846, 196 15 404, 196 06 844, 196 16 569, 196 18 270 and 196 14 349, and in WO-A-96/03479. Particularly useful detergent additives are sold by BASF AG, Ludwigshafen, under the tradename Kerocom® PIBA. These contain polyisobutenylamines dissolved in aliphatic $C_{10}$-$C_{14}$-hydrocarbons. The detergent additives used according to the invention, in particular the preferably used polyisobutenylamine additives, usually have a number average molecular weight $M_n$ of from about 150 to about 5000, preferably from about 500 to 2000, in particular from about 800 to 1500, g per mol.

For a more exact definition of the individual fuel additives mentioned, reference is made here expressly to the disclosures of the abovementioned prior art publications.

The fuel additives used according to the invention or fuels to which said additives have been added may also contain further conventional components and additives, for example further carrier oils, corrosion inhibitors, demulsifiers and markers, in addition to said carrier oils and detergent additives.

Examples of further useful carrier oils or carrier oil liquids are mineral carrier oils or synthetic carrier oils which differ from the carrier oils prepared according to the invention and mixtures thereof which are compatible with the additive or additives used and with the fuel. Suitable mineral carrier oils are fractions obtained in mineral oil processing, such as kerosene or naphtha, brightstock or base oils having viscosities of, for example, class SN 500–2000, but also aromatic hydrocarbons and paraffinic hydrocarbons.

Examples of suitable synthetic carrier oils are polyolefins, (poly)esters and polyethers, aliphatic polyetheramines, alkylphenol-initiated polyethers and alkylphenol-initiated polyetheramines. Suitable carrier oil systems are described, for example, in DE-A-38 38 918, DE-A-38 26 608, DE-A-41 42 241, DE-A-43 09 074, U.S. Pat. No. 4,877,416 and EP-A-0 452 328, which are hereby incorporated by reference.

Further conventional additives are corrosion inhibitors, for example based on ammonium salts of organic carboxylic acids, which ammonium salts tend to form films, or on heterocyclic aromatics in the case of corrosion protection of nonferrous metals, antioxidants or stabilizers, for example based on amines, such as p-phenylenediamine, dicyclohexylamine or derivatives thereof, or on phenols, such as 2,4-di-tert-butylphenol or 3,5-di-tert-butyl-4-hydroxyphenylpropionic acid, demulsifiers, antistatic agents, metallocenes, such as ferrocene or methylcyclopentadienyl-manganesetricarbonyl, lubricity additives, such as specific fatty acids, alkenylsuccinic esters, bis(hydroxyalkyl)-fatty amines, hydroxyacetamides or castor oil, and markers. It is also possible to add amines for lowering the pH of the fuel.

In the novel detergents and cleaning agents, the nonionic surfactants prepared according to the invention can be combined with conventional further components. These are, for example, further nonionic, cationic, anionic or zwitterionic surfactants, cosurfactants, e.g. alcohols, solubilizers, e.g. cumyl sulfonate, bleaches, fillers, complexing agents, dyes and fragrances, solvents and enzymes.

Finally, the present invention relates to the use of basic aluminates according to the above definition as catalysts for the oxyalkylation of compounds having at least one active H atom, for example the compounds stated in DE-A-38 43 713, and in particular of alkanols with alkylene oxides.

The following nonlimiting examples illustrate the novel use of basic aluminates as catalysts for the preparation of carrier oils for fuel detergent additives and for the preparation of nonionic surfactants by oxyalkylation.

EXAMPLE 1

Preparation of a Carrier Oil 250 g (1.25 mol) of tridecanol N are pretreated together with 4.25 g of sodium aluminate (0.3% by weight, density (20° C.)=2.350 g/cm$^3$, bulk density=860 g/l), based on the total batch, under reduced pressure at 25 mbar and at 80° C. for one hour in a rotary evaporator. The mixture obtained is introduced into a pressure-resistant autoclave and heated to 135° C. At this temperature, 1160 g (20 mol) of propylene oxide gas are introduced at superatmospheric pressure of 6 bar in the course of about 15 hours. The reaction mixture obtained is then filtered with the aid of a pressure filter and with the use of a deep-bed filter from Seitz and is characterized by the following analytical data:

| Experiment | OHN[1] [mg of KOH/g] | INK(K)[2] [g of iodine/ 100 g] | Viscosity[3] 25° C. [mPas] | Iodine color number[4] [mg of iodine/100 cm$^3$] |
|---|---|---|---|---|
| Comparative experiment with KOH catalysis | 60 | 1 | 115 | 1 |
| Example 1 | 69 | 8.6 | 85.2 | 1 |

[1]OH number; determination according to DIN 53240, DMAP method (1993)
[2]Iodine number; determination according to Kaufmann, DGF C-VII
[3]Determination using Haake rotational viscometer VT 550
[4]Determination using iodine color scale

| Experiment | Mono-PG[1] [%] | Di-PG [%] | Tri-PG [%] |
|---|---|---|---|
| Comparative experiment with KOH analysis | 0.4 | 0.3 | 1.0 |
| Example 1 | <0.3 | <0.3 | <0.3 |

[1]PG = propylene glycol

The PG byproducts were determined by gas chromatography using an internal standard (Headspace GC, separation column: DB 1701)

EXAMPLE 2

Preparation of a Carrier Oil 160 g (0.80 mol) of tridecanol N are pretreated together with 4.30 g of sodium aluminate (0.3% by weight), based on the total batch, under reduced pressure at 25 mbar and at 80° C. for one hour in a rotary evaporator. The mixture obtained is introduced into a pressure-resistant autoclave and heated to 145° C. At this temperature, 1267 g (17.6 mol) of butylene oxide gas are introduced at superatmospheric pressure of 6 bar and in the course of about 15 hours. The reaction mixture obtained is then filtered and is characterized by the following analytical data:

1. Chemical characterization

| Experiment | OHN [mg of KOH/g] | IN(K) [g of iodine/100 g] | Viscosity 25° C. [mPas] | Iodine color number [mg of iodine/100 cm³] |
|---|---|---|---|---|
| Comparative experiment with KOH catalysis | 40 | — | — | — |
| Example 2 | 51 | 3.2 | 263 | 2 |

The determination of the residual metal content gave the following results:

| Experiment | Catalyst | Metal content [ppm] Na | Al | K |
|---|---|---|---|---|
| Comparative product | KOH | — | — | <10 |
| Heterogeneous catalysis | Sodium aluminate | 40 | <10 | — |

Na, K and Al were determined according to the APV 2 digestion method, by atomic absorption spectrometry.

2. Engine tests

Regarding the cleanliness of the intake valve, the following results were obtained for various motor vehicle types:

a) Cleanliness of intake valve: OPEL KADETT according to CEC F04-A-87

| Fuel | Additive packet | Dosage [mg/kg] | Valve deposits [mg/valve] 1 | 2 | 3 | 4 | Average [mg] |
|---|---|---|---|---|---|---|---|
| No. 493 | Base value | | 390 | 213 | 104 | 510 | 304 |
| No. 493 | Comparative product KOH catalysis | 300 | 2 | 42 | 1 | 0 | 11 |
| No. 493 | Heterogeneous catalysis sodium aluminate | 300 | 4 | 46 | 0 | 0 | 13 | b) Cleanliness of intake valves: MERCEDES BENZ M 102 E according to CEC F05-A-93

| Fuel | Additive packet | Dosage [mg/kg] | Valve deposits [mg/valve] 1 | 2 | 3 | 4 | Average [mg] |
|---|---|---|---|---|---|---|---|
| No. 493 | Base value | | 279 | 232 | 279 | 261 | 267 |
| No. 493 | Comparative product KOH catalysis | 500 | 3 | 34 | 38 | 18 | 23 |
| No. 493 | Heterogeneous catalysis sodium aluminate | 500 | 0 | 93 | 0 | 11 | 26 |

EXAMPLE 3

Preparation of a Nonionic Surfactant 250 g (1.17 mol) of $C_{13/15}$-oxo alcohol are pretreated, together with 1.6 g of sodium aluminate (0.2% by weight), based on the total batch, under reduced pressure at 25 mbar and at 80° C. for one hour in a rotary evaporator. The mixture obtained is introduced into a pressure-resistant autoclave and heated to from 120 to 130° C. At this temperature, 566.3 g (12.9 mol) of ethylene oxide gas are introduced at superatmospheric pressure of up to about 8 bar and in the course of about 12 hours. The reaction mixture obtained is then filtered and is characterized by the following analytical data:

| Experiment | OHN [mg of KOH/g] | IN(K) [g of iodine/100 g] | Viscosity 25° C. [mPas] | Iodine color number [mg of iodine/100 cm³] |
|---|---|---|---|---|
| Commercial product | 82 | 4 | 36 | 1 |
| Example 3 | 81 | 0.3 | 38 | 2 |

| Experiment | Monoethylene glycol [%] | Diethylene glycol [%] | Triethylene glycol [%] | Tetraethylene glycol [%] |
|---|---|---|---|---|
| Commercial product | <0.5 | <0.5 | <0.5 | <0.5 |
| Example 3 | <0.5 | <0.5 | <0.5 | <0.5 |

-continued

| Experiment | Catalyst | Metal content [ppm] | | |
|---|---|---|---|---|
| | | Na | Al | K |
| Commercial product | KOH | — | — | 750 |
| Example 3 | Sodium aluminate | 44 | 9 | — |

EXAMPLE 4

Preparation of a Nonionic Surfactant 250 g (1.17 mol) of $C_{13/15}$-oxo alcohol are pretreated, together with 8.1 g of sodium aluminate (1.0% by weight), based on the total batch, under reduced pressure at about 25 mbar and at 80° C. for one hour in a rotary evaporator. The mixture obtained is introduced into a pressure-resistant autoclave and heated to from 120 to 130° C. At this temperature, 566.3 g (12.9 mol) of ethylene oxide gas are introduced at superatmospheric pressure of up to about 6 to 8 bar and in the course of about 12 hours. The reaction mixture obtained is then filtered and is characterized by the following analytical data:

| Experiment | OHN [mg of KOH/g] | IN(K) [g of iodine/100 g] | Viscosity 25° C. [mPas] | Iodine color number [mg of iodine/100 cm³] |
|---|---|---|---|---|
| Commercial product | 82 | 4 | 36 | 1 |
| Example 4 | 87 | 0.4 | 37 | 7 |

| Experiment | Monoethylene glycol [%] | Diethylene glycol [%] | Triethylene glycol [%] | Tetraethylene glycol [%] |
|---|---|---|---|---|
| Commercial product | <0.5 | <0.5 | <0.5 | <0.5 |
| Example 4 | <0.5 | <0.5 | <0.5 | <0.5 |

| Experiment | Catalyst | Metal content [ppm] | | |
|---|---|---|---|---|
| | | Na | Al | K |
| Commercial product | KOH | — | — | 750 |
| Example 4 | Sodium aluminate | 310 | 22 | — |

The table below shows the results of a comparison of commercial product ($C_{13/15}$-oxo alcohol+11 EO) with the corresponding reaction product prepared by the novel use of basic aluminates as catalyst.

Comparison: $C_{13/15}$ oxo alcohol+11 EO

| | $C_{13/15}$-oxo alcohol + 11 EO commercial product | $C_{13,15}$-oxo alcohol + 11 EO (1% by weight of catalyst)[1] | $C_{13/15}$-oxo alcohol + 11 EO (0.1% by weight of catalyst)[2] |
|---|---|---|---|
| pH (1 g/l) | 9.8 | 9.7 | 9.7 |
| IT [mN/m] (1 g/l; 25° C.) | 3 min  30 min | 3 min  30 min | 3 min  30 min |
| Decane | 4.9  4.2 | 4.5  3.9 | 5.2  4.7 |
| Hexadecane | 5.1  4.6 | 3.3  2.7 | 4.9  5.1 |
| IPM | 4.9  4.4 | 3.0  2.8 | 4.4  4.1 |
| Olive oil | 4.3  2.6 | 2.1  1.6 | 2.7  2.1 |
| Neutral oil 1A | 1.5  1.5 | 1.3  1.2 | 1.4  1.4 |
| Contact angle [degrees] (0.2 g/l; 40° C.) | 0 | 0 | 0 |
| $H_2O$ | 0 | 0 | 0 |
| PE  125 | 0 | 0 | 22 |
| V2A  92 | 16 | 0 | 13 |
| Ceramic  98 | | | |
| Glass  95 | | | |
| ST [mN/m] | 0.2  1 g/l | 0.2 g/l  1 g/l | 0.2 g/l  1 g/l |
| 25° C. | g/l  31.2 | 30.8  29.9 | 31.1  30.2 |
| 40° C. | 31.2 | | |
| Turbidity point in water [° C.] 10 g/l | 82 | 82 | 89 |
| Wetting power on cotton [sec] (1 g/l; 23° C.) | 39 | 27 | 40 |
| Solubility [1 g/l] (turbidity units) | 1 (clear)  1 (clear) | 1 (clear)  1 (clear) | 1 (clear)  1 (clear) |
| Demineralized water 25° C. 40° C. 20° dH 25° C. | 1 (clear) | 1 (clear) | 1 (clear) |
| Fat-removing power [sec] (1 g/l; 40° C.) (olive oil/neutral oil) Teflon PE V2A Ceramic Glass | in each case >600 | in each case >600 | in each case >600 |

[1] $C_{13/15}$-oxo alcohol + 11 EO; catalyst: sodium aluminate (1% by weight)
[2] $C_{13/15}$-oxo alcohol + 11 EO; catalyst: sodium aluminate (0.1% by weight)
IT = interfacial tension
ST = surface tension

Result

Regarding the colloid chemistry data, the two novel products are virtually identical to the commercial product.

We claim:

1. A process for the oxyalkylation of alkanols comprising a base-catalyzed reaction of at least one alkanol with at least one alkylene oxide, wherein the reaction is carried out using a heterogeneous basic catalyst which is selected from basic aluminates.

2. A process as claimed in claim 1, wherein the basic aluminate is selected from alkali metal and alkaline earth metal aluminates.

3. A process as claimed in claim 1, wherein
   a) the alkanol is first activated with the basic aluminate and
   b) the activated alkanol is oxyalkylated with the alkylene oxide.

4. A process as claimed in claim 1, wherein the aluminate is used in an amount of from 0.1 to 1.0% by weight, based on the total weight of the alkanol and alkylene oxide.

5. A process as claimed in claim 3, wherein the alkanol-activation is effected at from 10 to 100 mbar and from about 20 to 150° C.

6. A process as claimed in claim 3, wherein the oxyalkylation of the activated alkanol is effected at from about 1 to 10 bar and from about 100 to 160° C.

7. A process as claimed in claim 1, wherein the alkanol is selected from a straight-chain or branched, monohydric $C_2$–$C_{22}$-alkanol or mixtures of such alkanols and the alkylene oxide is selected from a $C_2$–$C_6$-alkylene oxide or mixtures of such alkylene oxides.

8. A process as claimed in claim 1, wherein from about 1 to 100 moles of alkylene oxide are used per mole of alkanol.

* * * * *